United States Patent
Ouyang et al.

(10) Patent No.: US 8,347,246 B2
(45) Date of Patent: *Jan. 1, 2013

(54) PLACEMENT AND OPTIMIZATION OF PROCESS DUMMY CELLS

(75) Inventors: Xu Ouyang, Hopewell Junction, NY (US); Geng Han, Fishkill, NY (US); Lars W. Liebmann, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,795

(22) Filed: Mar. 30, 2012

(65) Prior Publication Data

US 2012/0192137 A1   Jul. 26, 2012

Related U.S. Application Data

(62) Division of application No. 12/124,472, filed on May 21, 2008.

(51) Int. Cl.
*G06F 17/50* (2006.01)
(52) U.S. Cl. ........................................ 716/110
(58) Field of Classification Search .................. 716/100, 716/110
See application file for complete search history.

(56) References Cited

U.S. PATENT DOCUMENTS

| | | | |
|---|---|---|---|
| 5,646,427 A | 7/1997 | Smith et al. | |
| 6,438,052 B1 * | 8/2002 | Sekine | 365/149 |
| 6,493,261 B1 | 12/2002 | Hamilton et al. | |
| 6,707,078 B1 | 3/2004 | Shiraiwa et al. | |
| 6,743,674 B2 | 6/2004 | Wang | |
| 7,259,393 B2 | 8/2007 | Chung et al. | |
| 7,582,494 B2 | 9/2009 | Chung et al. | |
| 7,643,345 B2 | 1/2010 | Ishibashi | |
| 7,737,016 B2 | 6/2010 | Blatchford et al. | |
| 7,746,717 B1 | 6/2010 | Peng et al. | |
| 7,804,706 B2 | 9/2010 | Zhong et al. | |
| 2002/0087942 A1 | 7/2002 | Kitada | |
| 2003/0185068 A1 * | 10/2003 | Saito et al. | 365/200 |
| 2007/0002617 A1 * | 1/2007 | Houston et al. | 365/185.07 |
| 2007/0026628 A1 | 2/2007 | Chung et al. | |
| 2007/0134921 A1 | 6/2007 | Tian et al. | |
| 2007/0196986 A1 * | 8/2007 | Ichige et al. | 438/266 |
| 2007/0236986 A1 | 10/2007 | Fifield et al. | |
| 2008/0002497 A1 | 1/2008 | Barth, Jr. et al. | |
| 2008/0014684 A1 | 1/2008 | Blatchford et al. | |
| 2008/0158964 A1 | 7/2008 | Ishibashi | |
| 2009/0073796 A1 | 3/2009 | Ahsan et al. | |
| 2009/0196118 A1 | 8/2009 | Bartley et al. | |
| 2009/0278222 A1 | 11/2009 | Chadwick et al. | |
| 2010/0041232 A1 * | 2/2010 | Summerfelt et al. | 438/669 |
| 2011/0004859 A1 * | 1/2011 | Summerfelt et al. | 716/124 |

* cited by examiner

*Primary Examiner* — Suchin Parihar
(74) *Attorney, Agent, or Firm* — Ian D MacKinnon; Howard M Cohn (57) ABSTRACT

A method for laying out process dummy cells in relationship to inside memory cells of a memory array includes (a) calculating an initial process performance parameter for the memory array; (b) changing dummy cell layout configuration for a layer electrically connected to inside cells; (c) applying lithographic simulation and yield model for both the inside memory cells and the changed layout configuration process dummy cells; and (d) repeating steps (b) and (c) until yield is maximized. Checks may be performed to ensure that there is enough room to make the change and that there is no significant adverse effect to neighboring circuits. The process performance parameter may be yield or a process window for the inside memory cells.

8 Claims, 7 Drawing Sheets

FIG. 7

PLACEMENT AND OPTIMIZATION OF PROCESS DUMMY CELLS

CROSS REFERENCE TO RELATED APPLICATIONS

This application is a division of commonly-owned, copending U.S. patent application Ser. No. 12/124,472 entitled PLACEMENT AND OPTIMIZATION OF PROCESS DUMMY CELLS, and filed on May 21, 2008.

FIELD OF THE INVENTION

The invention relates to semiconductor device fabrication and, more particularly, to the use of dummy structures such as dummy cells which are process dummies.

BACKGROUND OF THE INVENTION

Integrated circuits (ICs) may incorporate many elements, structures and features, such as patterns of polysilicon, contacts and metal layers. A memory array, for example, may include a number of transistors, word lines, bitlines and contacts.

The processes used for making ICs, such as lithography (sometimes referred to as printing) and etching (including chemical mechanical etching) may be sensitive to the uniform distribution and proximity of patterns of the elements, structures and features. Hence, it is generally known that certain benefits can be derived from incorporating "dummy" features into a design for an IC. These dummy features may be referred to as "process dummies", since they do not perform any electrical function in the circuit. As used herein, a "feature" may include an element, a pattern or a structure.

One application for process dummy cells is in static random access memory (SRAM). The conventional practice is to place process dummy cells around an active array area comprising inner memory cells, the process dummy cells being of substantially same size and same periodicity as regular memory cells to preserve regularity and periodicity to aid printing, which is the purpose of using dummy cells.

This disclosure is directed to the "dummy cells" which are dummy features which replicate active cells, such as static random access memory (SRAM) cells, but which do not perform any circuit function. In other words, the process dummy cells discussed herein are passive, performing no active circuit functions such as timing, area efficiency, suppress leakage, etc. For purposes of this disclosure, dummy cells which perform active circuit functions are not considered to be "process dummies".

The dummy cells discussed herein may (or may not) have everything (all of the patterns) that they need to be functional, but since the dummy cells discussed herein are designed not to be functional cells, therefore they are not hooked to periphery circuits to be functional.

Memory Array Architecture, Generally

Memory arrays are well known, and comprise a plurality (many, including many millions) of memory cells organized (including physically arranged) in rows (usually represented in drawings as going across the page, horizontally, from left-to-right) and columns (usually represented in drawings as going up and down the page, from top-to-bottom).

Figure 1:
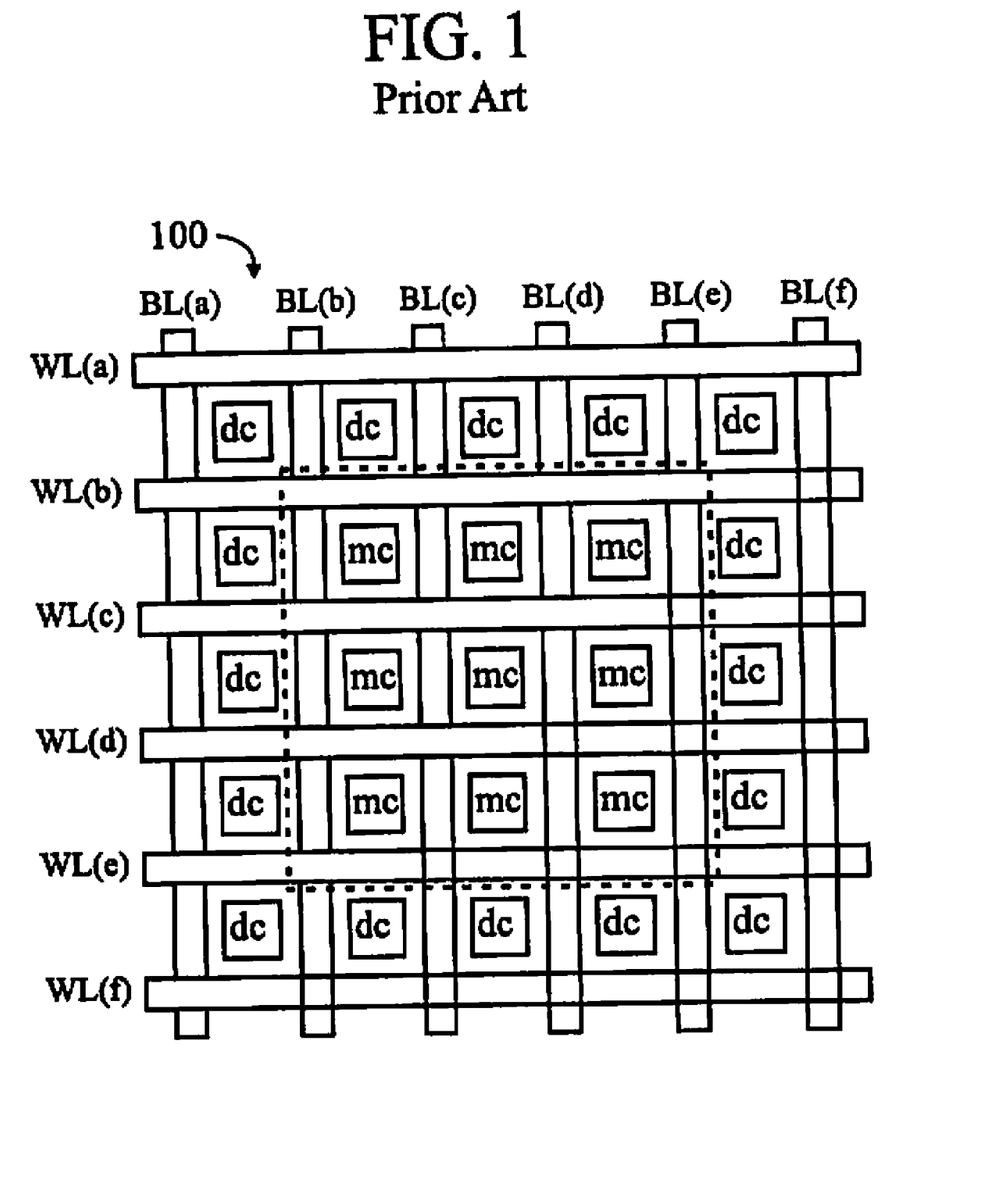
FIG. 1 is a diagram of a memory array, according to the prior art.

FIG. 1 illustrates an exemplary memory array 100. A plurality of bitlines, labeled BL(a) through BL(f), may extend in parallel with one another, vertically through the array (or a portion thereof). A plurality of wordlines, labeled WL(a) through WL(f), may extend in parallel with one another, horizontally through the array (or a portion thereof).

A plurality of memory cells, each labeled "mc", are placed (disposed) inside of an "active array area" of the array, within the dashed line box. These memory cells "mc" may be referred to as "active memory cells", or "inside cells", or "inner cells", and perform the function of storing data as analog voltages, in the usual manner. The nine inside cells "mc" illustrated in FIG. 1 are representative of many millions of memory cells that may be resident on a single chip. This disclosure is generally directed to memory cells, and is not limited to any particular type of memory cell, such as DRAM or SRAM.

Additional "dummy" memory cells, each labeled "dc", may be placed (disposed) around a peripheral area of the array, outside of the active array area, without the dashed-line box. For purposes of this disclosure the dummy cells "dc" may be formed with substantially the same structure as the active memory cells "mc", but perform no circuit function (including not storing data). The dummy cells may be missing an element which would make them functional, or they may simply not be connected or operated to be functional. Even if the dummy cells are fully functional and are connected to the WLs and BLs, they are not used (not addressed).

The dummy cells are placed around the active array area (outside of the dashed-line box) so that inside cells at the edges of the active array area can be fabricated in an environment similar to inside cells that are more interior to the active array area and surrounded by other inside cells. If there were no dummy cells around the active array area, the inside cells at the edges of the active array area would have an environment different to inside cells that are more interior to the active array area, and this environmental difference may manifest itself in undesirable process results. Generally, in semiconductor fabrication, uniformity is usually preferred. The process dummy cells provide such uniformity.

There may be a horizontal row of dummy cells "dc" extending across the top of the cell area (on top of the dashed line box), another horizontal row of dummy cells "dc" extending across bottom of the cell area (below the dashed line box), a vertical column of dummy cells "dc" extending down the left side of the cell area (to the left of the dashed line box), and another vertical column of dummy cells "dc" extending down the left side of the cell area (to the right of the dashed line box). There may be several rows and columns of such process dummy cells "dc" on each of the four sides of the cell area.

According to conventional techniques, the process dummy cells are laid out to have the same (substantially identical) layout configuration (size, shape and position) as the inside cells. This may include, for example, disposing the dummy cells in a same position within an active area as the inside cells, and spacing the dummy cells a same distance from neighboring wordlines as the inside cells.

SUMMARY OF THE INVENTION

It is an object of the invention to provide an improved technique for using process dummy cells.

According to the invention, generally, the layout configuration (size, shape and position) of process dummy cells may be modified to improve a process performance parameter such as yield or manufacturability (such as process window).

As used herein, dummy cells may resemble (or be substantial identical to) standard cells used in memory arrays, but are implemented as process dummies without having any circuit function.

Dummy cells may be used to improve process latitude, but they can contribute to yield loss if they are shorted to active circuitry/cells, or to other features of the memory array such at word lines or bitlines. For example, a short between a bitline contact to poly (word line) may drag down the voltage on bitline and cause the whole bitline to fail. A defect of an inside cell will, of course, cause the same problem, but there is generally nothing that can be done to the inside cells since they are used for circuit functions. But the dummy cells can be modified to significantly reduce the probability of such failures.

According to the invention, generally, two approaches are disclosed, depending on technology/design requirements:

Optimize dummy cells to reduce failures in dummy cells or between dummy cells and inside cells Change location/shapes of dummy cells to optimize process window of inside cells These two approaches can be combined to optimize both inside cells and failures caused by dummy cells. Additionally, different design rules can be established and applied to different areas of the layout, i.e., dummy cells and inside cells.

According to an embodiment of the invention, a method for laying out process dummy cells in relationship to inside memory cells of a memory array may comprise the steps of:

(a) calculating an initial process performance parameter for the memory array;

(b) changing dummy cell layout configuration for a layer electrically connected to inside cells;

(c) applying lithographic simulation and yield model for both the inside memory cells and the changed layout configuration process dummy cells; and (d) repeating steps (b) and (c) until yield is maximized Between the steps (b) and (c), a check may be performed to ensure that there is enough room to make the change. Also, between the steps (b) and (c), a check may be performed to ensure that there is no significant adverse effect to neighboring circuits.

The process performance parameter may be yield; and in the step (c), limited yield due to the dummy cells may be calculated. In the step (d), yield before and after the change may be compared.

The process performance parameter may be yield; and the dummy cell layout may be changed in small steps, and each time a small step is made, a check may be performed to determine whether yield is improved. The layout configuration may be selected from the group consisting of size, shape and position of at least selected ones of the process dummy cells.

The process performance parameter may be a process window for the inside memory cells; and the method may further comprise:

putting the process dummy cells on separate layers from the inside memory cells;

in the step (c), applying lithographic simulation to changed layout and check if process window for the inside cell is improved; and repeating steps (b) and (c) until process window for the inside memory cells is maximized.

According to an embodiment of the invention, a memory array comprising an active array area, memory cells inside of the active array area, and process dummy cells outside of the active array area, may be characterized in that: selected ones of the process dummy cells have a layout configuration which is different than a layout configuration for the memory cells inside of the active array area. The layout configuration for the process dummy cells may be selected from the group consisting of size, shape and position. The layout configuration for the process dummy cells may be selected based on improving a process performance parameter. The process performance parameter may comprise yield. The process performance parameter may comprise a process window for the inside memory cells.

According to an embodiment of the invention, a design structure embodied in a machine readable medium for designing, manufacturing, or testing a design, the design structure may comprise: process dummy cells having a layout configuration which is different than a layout configuration for the memory cells inside of a active array area of a memory array. The design structure may comprise a netlist, which describes the design. The design structure may reside on storage medium as a data format used for the exchange of layout data of integrated circuits. The design structure may include at least one of test data files, characterization data, verification data, or design specifications.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

If shading or cross-hatching is used, it is intended to be of use in distinguishing one element from another (such as a cross-hatched element from a neighboring un-shaded element. It should be understood that it is not intended to limit the disclosure due to shading or cross-hatching in the drawing figures.

In some of the figures, particularly cross-sectional views of semiconductor devices in various stages of fabrication, some elements may be drawn with very straight edges intersecting with other edges at precise (such as 90-degree) angles, for illustrative clarity. One of ordinary skill in the art will appreciate that the edges may not be so straight, and the intersections may be rounded, due to the nature of the processes (such as etching) used to form the various elements of the semiconductor devices.

Elements of the figures may (or may not) be numbered as follows. The most significant digits (hundreds) of the reference number correspond to the figure number. For example, elements of FIG. 1 are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199a, 199b, 199c, etc. Such relationships, if any, between similar elements in the same or different figures will become apparent throughout the specification, including, if applicable, in the claims and abstract.

Conventional electronic components may be labeled with conventional schematic-style references comprising a letter (such as A, C, Q, R) indicating the type of electronic component (such as amplifier, capacitor, transistor, resistor, respectively) followed by a number indicating the iteration of that element (such as "1" meaning a first of typically several of a given type of electronic component). Components such as resistors and capacitors typically have two terminals, which may be referred to herein as "ends". In some instances, "signals" are referred to, and reference numerals may point to lines that carry said signals. In the schematic diagrams, the various electronic components are connected to one another, as shown. Usually, lines in a schematic diagram which cross over one another and there is a dot at the intersection of the two lines are connected with one another, else (if there is no dot at the intersection) they are typically not connected with one another.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE INVENTION

In the description that follows, numerous details are set forth in order to provide a thorough understanding of the present invention. It will be appreciated by those skilled in the art that variations of these specific details are possible while still achieving the results of the present invention. Well-known processing steps and materials are generally not described in detail in order to avoid unnecessarily obfuscating the description of the present invention.

It is known to add dummy cells (process dummies) in addition to the active (inside) cells to even out the environment, such as at the edges of the active array area. When the dummy cells are substantially identical (physically) to the active cells, they can have the same failure mode (such as contact-to-poly short) with the same undesirable results, even though the problems associated with dummy cells causing failures may not be a design error, may not constitute a violation of design rules, and may not be an OPC (optical proximity correction) error or an ORC (optical rules checking) error.

However, weak spots in a design, such as tight contact-to-poly spaces may fail first, and adding dummy cells which are substantially identical to active cells simply exacerbates the problem. The failures attributable to the dummy cells (and also to the active cells) may include (in the context of a memory array, such as illustrated in FIG. 1) shorts and opens, causing the wordline to be open or shorted to ground, shorting a wordline to a bitline, and others. The specific defects will be design dependent. Generally, defects in each region (in relation to the array) may cause different failures. However, it may be noted that only electrically connected layers will cause a failure to inside cells.

Embodiment 1

Figure 2A:
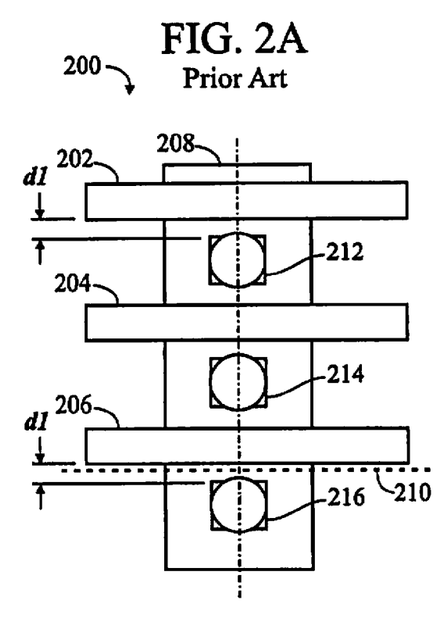
FIG. 2A is a diagram of a portion of a memory array, according to the prior art.
Figure 2B:
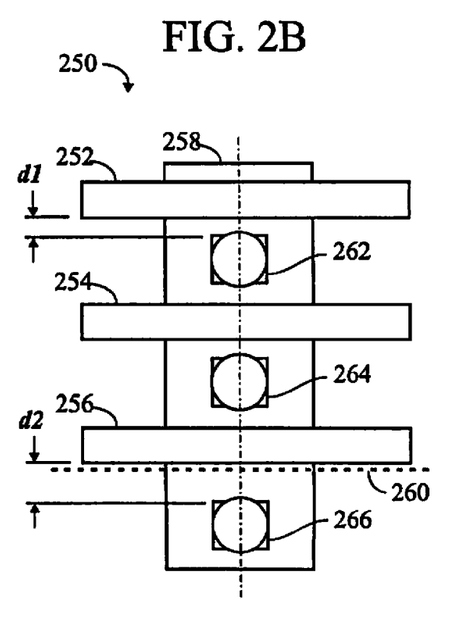
FIG. 2B is a diagram of a portion of a memory array, according to an embodiment of the invention.

An embodiment of the invention is illustrated with respect to FIGS. 2A and 2B.

FIG. 2A illustrates a portion of an exemplary memory array 200, according to the prior art. Various layers of materials are illustrated.

Three polysilicon lines 202, 204, 206 are shown traversing an active area 208. The polysilicon lines may be wordlines, and may be evenly spaced from one another. (The "active area" 208 describes an area of silicon where devices may be fabricated, and should not be confused with active array area, such as within the rectangular box in FIG. 1.)

A dashed line 210 represents an edge of a cell area of the array. Above the line 210 are active memory cells "mc" (see FIG. 1). Below the line 210 are dummy dells "dc" or process dummy patterns (see FIG. 1).

Three structures 212, 214 and 216, are shown, each of which is placed a distance d1 below a corresponding one of the poly lines 202, 204 and 206. The structures 212, 214 and 216 may be contacts, or bitline contacts. The structures 212, 214 and 216 are centered within the active area 208. (A vertical centerline is shown passing through the three structures 212, 214, 216.)

The top structure 212 and the middle structure 214 are representative of active cells, also referred to as "inner cells". The bottom structure 216 is representative of dummy cells.

In a failure mode, such as a contact shorting to a polysilicon line, each of the contacts 212, 214, 216 may have substantially the same likelihood of causing such a failure, since they are all similar to one another, and are all spaced equally, a distance d1, from the polysilicon lines 202, 204, 206. This is representative of a process dummy cell causing failure of an array, or a portion thereof.

FIG. 2B illustrates a portion of a memory array 250, according to an embodiment of the invention. Various layers of materials are illustrated.

Three polysilicon lines 252, 254, 256 are shown traversing an active area 258. The polysilicon lines may be wordlines, and may be evenly spaced from one another.

A dashed line 260 represents an edge of a cell area of the array. Above the line 260 are active memory cells "mc" (see FIG. 1). Below the line 260 are dummy dells "dc" (see FIG. 1).

Three structures 262, 264 and 266, are shown, each of which is disposed below a corresponding one of the poly lines 252, 254 and 256. The structures 262, 264 and 266 may be contacts, or bitline contacts. The structures 262, 264 and 266 are centered within the active area 258. (A vertical centerline is shown passing through the three structures 262, 264, 266.)

The top structure 262 and the middle structure 264 are representative of active cells, also referred to as "inner cells". The bottom structure 266 is representative of dummy cells.

Whereas in FIG. 2A (prior art) each of the structures (212, 214, 216) are disposed the same distance d1 below a corresponding one of the poly lines (202, 204, 206), in this embodiment, the two structures 262 and 264 which are contacts in the active area of the array and representative of active memory cells ("mc") are disposed a distance d1 below the corresponding poly lines 252 and 254. The contact 266 which is representative of a dummy cell ("dc") is disposed a distance d2, greater than d1, below the corresponding poly line 256.

In a failure mode, such as a contact shorting to a polysilicon line, the contact 266 may have less likelihood of causing a failure than the contacts 264 and 262, since it is spaced farther away from the corresponding poly line 256, and yield may be increased.

Generally, the desired outcome is to try to optimize yield (reduce failures associated with dummy cells) by increasing narrow contact-poly space when possible.

According to this embodiment of the invention, as illustrated by FIGS. 2A and 2B, a process dummy cell is moved further away from the poly line so as to reduce failures, such as shorts, thereby optimizing yield, when possible.

The contact 266 is representative of a feature of a dummy cell, and thus may be referred to as a "process dummy feature". The contacts 262 and 264, as well as the poly lines 252, 254, 256 are representative of features of active cells, and may thus be referred to as "active features". In this embodiment of the invention, the process dummy feature 266 is formed substantially similar to the active features 262 and 264, and has been repositioned, in one dimension (distance away from) another active feature 256.

It should be understood that if the contact 266 were to be moved too far away, the inner, active contact 264 near the edge of the cell area would have a different environment than the inner, active contact 262, which would undermine the purpose of a dummy contact (or dummy cell) evening out the environment for process uniformity.

Software performs lithographic/process simulation in real time or checks against a set of rules to confirm that the new optimized dummy cells still achieve substantially the same effectiveness on neighboring real circuit patterns (active cells).

Figure 3:
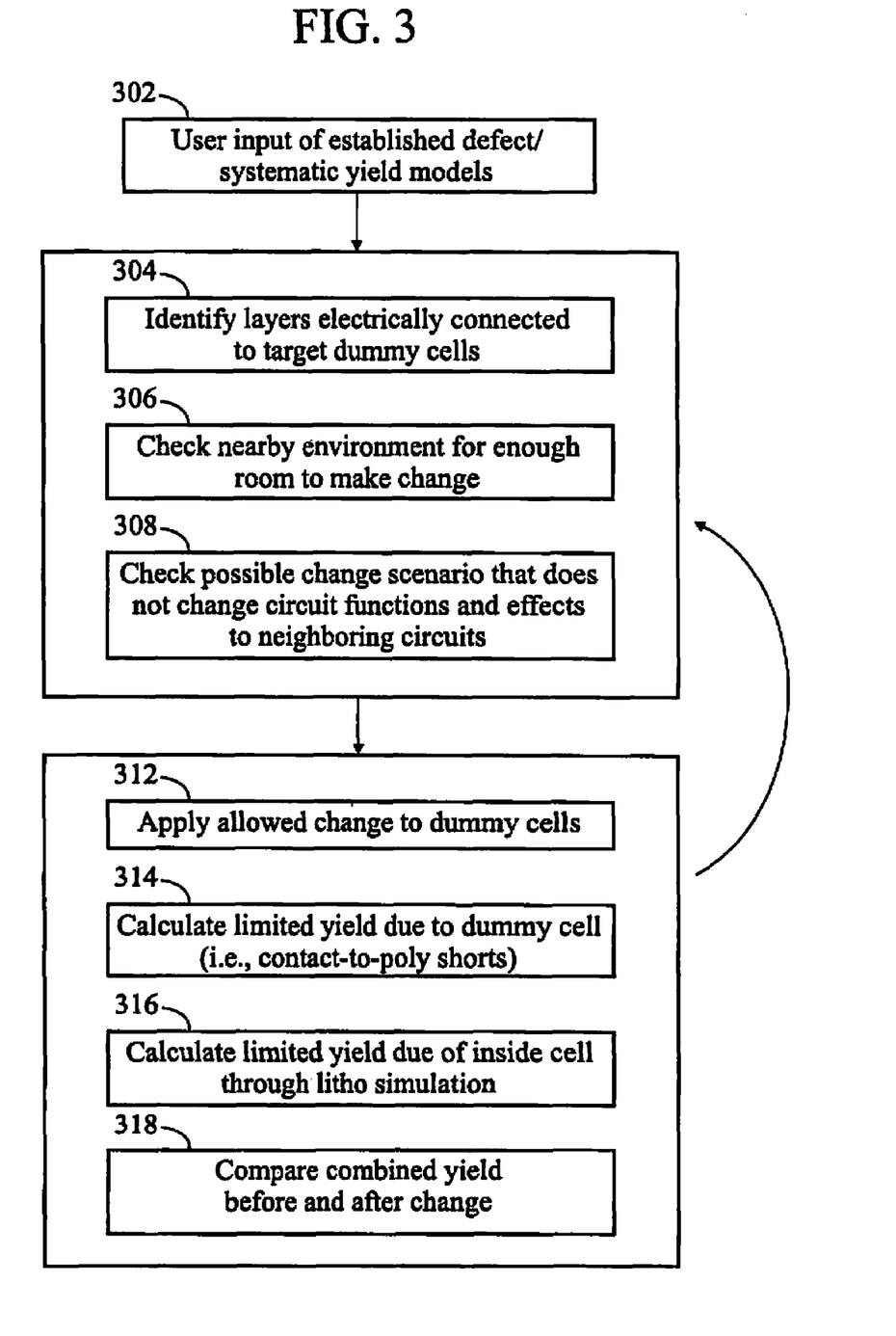
FIG. 3 is a flowchart of a software implementation of the technique illustrated in FIG. 2B, according to the invention.

FIG. 3 illustrates the technique for laying out process dummy cells, such as is illustrated in FIG. 2B, according to the invention, which may be performed in a conventional computer-based design and layout system. The shapes and/or positions of the dummy cells may be changed, to improve yield. Of particular interest are layers which are electrically connected to the inside cells of the array.

Generally, the placement (position) or the shape of the patterns in dummy cells may be changed to improve yield by reducing failures (such as shorts) due to critical design attributes, such as contact size or contact-to-poly spacing.

In a first step 302, the user may input established defect/systematic yield models. An initial (baseline) yield for the overall memory array, with no changes (before the changes discussed below) to the process dummy cells may be calculated.

Next, in steps 304, 306 and 308, circuit functionality may be checked, as follows.

In the step 304, layers may be identified which are electrically connected to target dummy cells. Generally, only electrically-connected layers will cause a failure to inside cells. (Dummy cells cannot "fail", since they do not perform any circuit function.)

In the step 306, the nearby environment may be checked to ensure that there is enough room to make the change, such as moving the dummy cell away from the wordline at the edge of the active array.

In the step 308, the possible change scenario may be checked as to whether it significantly changes circuit functions and has adverse effects to neighboring circuits. If not, the change is "allowed".

Next, in steps 312, 314, 316 and 318, yield comparison may be calculated, as follows.

In the step 312, the allowed change may be applied to the dummy cells. Generally, changes are applied in small steps so that improvements to yield for the memory array can be tracked, and maximized. The process is iterative.

Generally, a "layout configuration" for the dummy cells may be changed, and this may include any of size, shape and/or position or at least one of the dummy cells.

In the step 314, limited yield due to the dummy cell(s) may be calculated, such as resulting from contact-to-poly shorts. ("Limited yield" is a terminology in semiconductor manufacturing, it refers to the yield related to one mechanism.)

In the next step 316, limited yield of the inside cells may be calculated, such as through litho simulation or empirical yield models and yield-litho correlation models developed from test structures.

In the next step 318, the combined yield may be compared, before and after the proposed changes are implemented (in simulation).

The change should happen in small intervals (such as the contact is shifted down). When the change is good, another small interval is applied to shift it a bit further down. The steps of changing dummy cells shapes and positions may be repeated for the layer electrically connected to inside cells, and checking that circuit function is not changed, followed by applying lithographic simulation and yield model to the changed layout for both inside and dummy cells may iteratively be repeated, and may be stopped when there is no further improvement of yield. This is indicative of yield having been maximized, and the loop may be exited. The process of laying out dummy cells in relation to inside memory cells may be terminated.

Example of Yield Model

Yield models used in process-window and yield improvements can be built by two approaches.

Approach I: from inline electrical measurements of process-window test structures, test structure yield vs. critical design attributes can be calculated Approach II: yield/fail rate vs. process window can be calculated through process simulation Yield for a test structure may be calculated (eqn. 1), then used (eqn. 2) to estimate yield loss due to the dummy cell, as follows:

$$\text{Yield}_{TestStructure} = 1/(1+(N_{TestStructure}*L)/2)^2 \qquad \text{(eqn. 1)}$$

$$\text{Yield}_{SRAM} = 1/(1+(N_{SRAM}*L)/2)^2 \qquad \text{(eqn. 2)}$$

where:

N is statistics of critical design attribute, such as number of occurrences of minimum CA-PC space in design "L" is failure rate In the above example, negative binomial yield model is used. Various other yield models have also been used in semiconductor manufacturing such as Poisson yield model, which can also be used here.

Embodiment 2

Figure 4A:
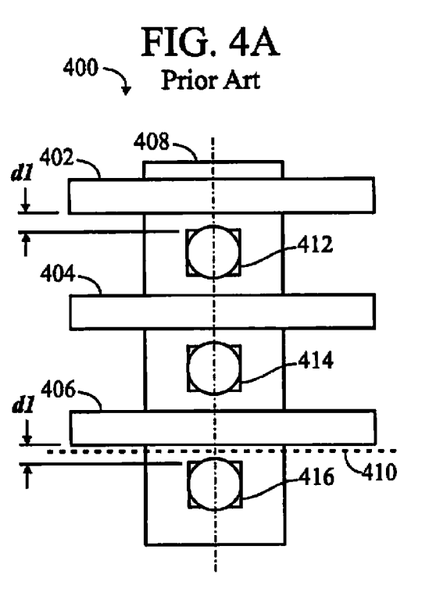
FIG. 4A is a diagram of a portion of a memory array, according to the prior art.
Figure 4B:
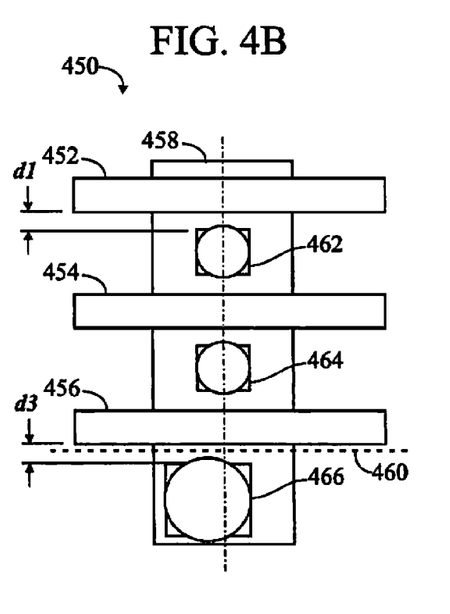
FIG. 4B is a diagram of a portion of a memory array, according to an embodiment of the invention.

A second embodiment of the invention is illustrated with respect to FIGS. 4A and 4B.

Some users may not have resources and available yield models to perform all of the calculations in the previous embodiment (Approach 1). The embodiment described hereinbelow (Approach 2) is at lithography/etch simulation level only, and is computationally simpler. The software customers may be different: Approach 1 is for the yield community, and Approach 2 is for the lithography community. Lithographers spend a lot of time maximizing "process windows" and this is geared toward this purpose. Assuming no yield loss in the dummy itself, maximizing process window will typically increase yield as well.

FIG. 4A is essentially the same as FIG. 2A, and illustrates a portion of an exemplary memory array 200, according to the prior art. Various layers of materials are illustrated.

Three polysilicon lines 402, 404, 406 are shown traversing an active area 408. The polysilicon lines may be wordlines, and may be evenly spaced from one another.

A dashed line 410 represents an edge of a cell area of the array. Above the line 410 are active memory cells "mc" (see FIG. 1). Below the line 410 are dummy dells "dc" (see FIG. 1).

Three structures 412, 414 and 416, are shown, each of which is disposed a distance d1 below a corresponding one of the poly lines 402, 404 and 406. The structures 412, 414 and 416 may be contacts, or bitline contacts. The structures 412, 414 and 416 are centered within the active area 408. (A vertical centerline is shown passing through the three structures 412, 414, 416.)

The top structure 412 and the middle structure 414 are representative of active cells, also referred to as "inner cells". The bottom structure 416 is representative of dummy cells.

In a failure mode, such as a contact shorting to a polysilicon line, each of the contacts 412, 414, 416 may have substantially the same likelihood of causing such a failure, since they are all similar to one another, and are all spaced equally, a distance d1, from the polysilicon lines 402, 404, 406. This is representative of a process dummy cell causing failure of an array, or a portion thereof.

FIG. 4B (compare FIG. 2B) illustrates a portion of a memory array 450, according to an embodiment of the invention. Various layers of materials are illustrated.

Three polysilicon lines 452, 454, 456 are shown traversing an active area 458. The polysilicon lines may be wordlines, and may be evenly spaced from one another.

A dashed line 460 represents an edge of a cell area of the array. Above the line 460 are active memory cells "mc" (see FIG. 1). Below the line 460 are dummy dells "dc" (see FIG. 1).

Three structures 462, 464 and 466, are shown, each of which is disposed below a corresponding one of the poly lines 452, 454 and 456. The structures 462, 464 and 466 may be contacts, or bitline contacts. The structures 462, 464 and 466 are centered within the active area 458. (A vertical centerline is shown passing through the three structures 462, 464, 466.)

The top structure 462 and the middle structure 464 are representative of active cells, also referred to as "inner cells". The bottom structure 466 is representative of dummy cells.

In FIG. 4A (prior art) each of the structures (412, 414, 416) are disposed the same distance d1 and position (centered in the active area 408) below a corresponding one of the poly lines (402, 404, 406).

In this embodiment, the two structures 462 and 464 which are contacts in the active area of the array and representative of active memory cells ("mc") are disposed a distance d1 below the corresponding poly lines 452 and 454, and centered in the active area 458.

In this embodiment, the contact 466 which is representative of a dummy cell ("dc") is disposed a distance d3, which may be different (including greater) than d1, below the corresponding poly line 456, may be a different size (such as larger) than the other contact structures 462 and 464, and may be positioned differently (not on the centerline of the active area 458) than the other contact structures 462 and 468.

The contact 466 is representative of a feature of a dummy cell, and thus may be referred to as a "process dummy feature". The contacts 462 and 464, as well as the poly lines 452, 454, 456 are representative of features of active cells, and may thus be referred to as "active features".

In this embodiment of the invention, the process dummy feature 466 may be formed differently than the active features 462 and 464, and has been repositioned, in two dimensions (distance away from and laterally off-center from) another active feature 456.

As was the case with the previous embodiment, it should be understood that changes to the dummy feature 466 (compare 266) creates a different environment for active features such as 464 near the edge (460) in contrast than more inner, active features 462 which may somewhat undermine the purpose of a dummy contact (or dummy cell) evening out the environment for process uniformity.

In the previous embodiment of the invention, the process dummy feature 266 was simply moved further away from the poly line 256 so as to reduce failures, such as shorts, thereby optimizing yield, when possible.

In this embodiment, the process dummy feature 466 is repositioned and/or resized to enlarge the process window, when possible.

In the previous embodiment, software performs lithographic/process simulation in real time or checks against a set of rules to confirm that the new optimized dummy still achieve substantially the same effectiveness on neighboring real circuit patterns (active cells).

In this embodiment, software performs lithographic/process simulation in real time to maximize process window. Software may check against a set of yield rules that restrict dummy shape/placement.

In the previous embodiment, the purpose is to maximize yield, and this may be accomplished by increasing the narrow contact-to-poly space when possible.

In this embodiment, the purpose is to maximize the process window of the inside cells. This may be accomplished by changing the size and/or the position of the dummy cells.

Figure 5:
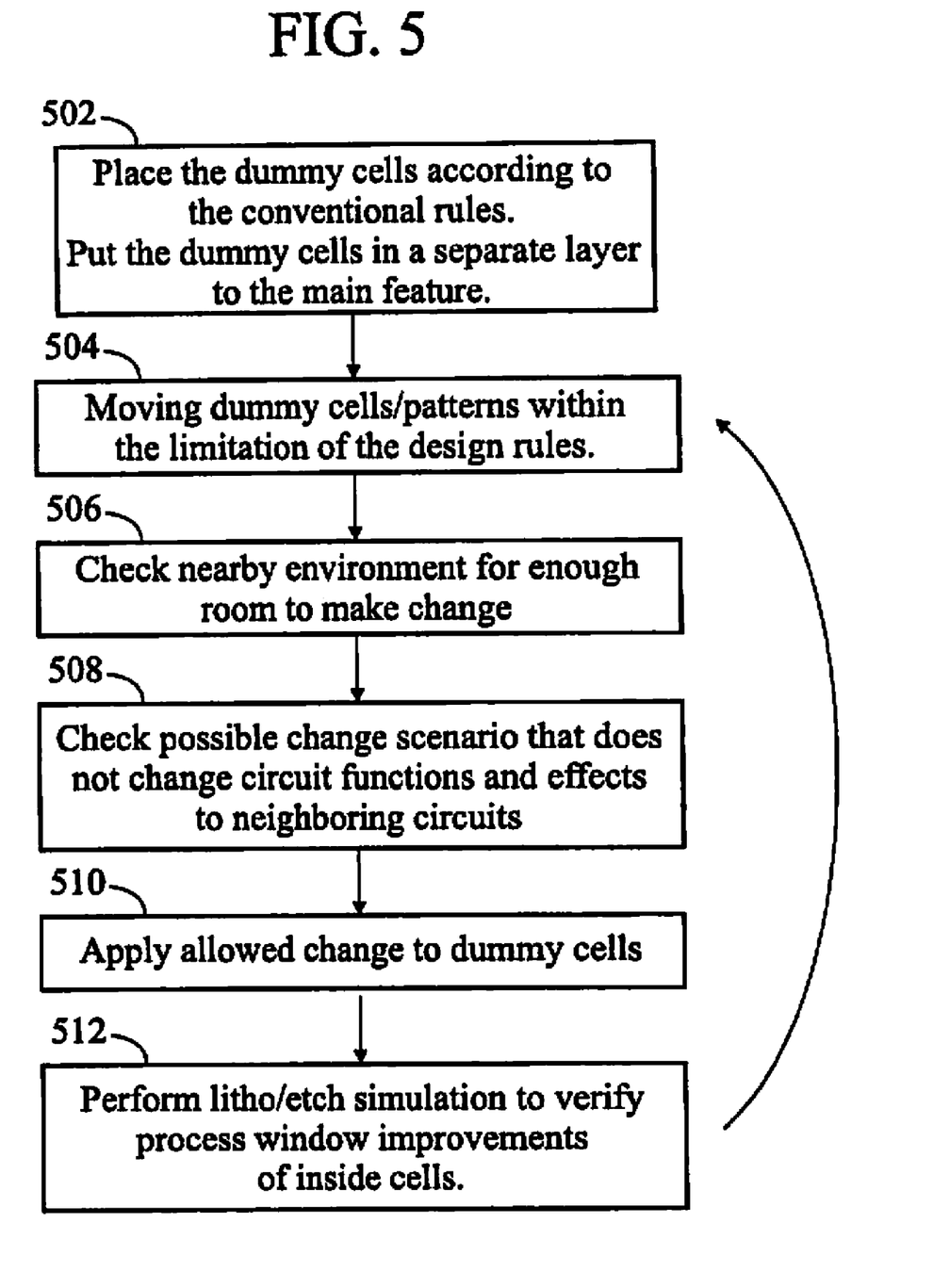
FIG. 5 is a flowchart of a software implementation of the technique illustrated in FIG. 4B, according to the invention.

FIG. 5 (compare FIG. 3) illustrates a technique for improving a process window of inside memory cells, such as is illustrated in FIG. 4B, according to the invention, which may be performed in a computer-based design and layout system. The shapes and/or positions of the dummy cells may be changed, to improve yield. Of particular interest are layers which are electrically connected to the inside cells of the array. In a simulation step, the dummy cells may be placed on a separate layer from the inside memory cells.

Generally, the placement of the dummy cells may be changed to improve yield by reducing failures (such as shorts) due to critical design attributes, such as contact size or contact-to-poly spacing.

Unlike the previous technique (FIG. 3), there is no need for the user to input established defect/systematic yield models.

In a step 502, the dummy cells may be placed according to conventional rules. The dummy cells may be put in a separate layer to the main feature. Process window maximization is typically done for all patterns in one layer. Putting the dummy cells on a separate layer is a deviation from standard lithography procedures. By putting dummy cells on a separate layer, the process window effect of the dummy cells on the inside cells can be optimized differently and separately from just the inside cells.

In a step 504, dummy cells (or patterns in the cell) may be moved within the limitation of the design rules. As was the case with the previous technique (FIG. 3), in this case the inside cells will not move and are frozen, only the dummy layer will adjust and only within design rule limit.

In a step 506 (compare 306), the nearby environment may be checked to ensure that there is enough room to make the change, such as moving the dummy cell away from the wordline at the edge of the active array.

In a step 508 (compare 308), possible change scenarios may be checked that do not change circuit functions and effects to neighboring circuits.

In a step 510 (compare 312), apply allowed change to dummy cells. Generally, changes are applied in small steps so that improvements to yield for the memory array can be tracked, and maximized. The process is iterative.

In a step 512, a litho/etch simulation may be performed to verify process window improvements of inside (active) cells. This is similar to Approach 1.

A typical iteration flow, repeating the steps of changing dummy cell shapes and positions, checking that circuit function is not changed, and applying lithographic simulation to the changed layout can be followed until the inside cells achieve the best possible process window.

Further Applications

Different layout-manipulation algorithms (OPC, yield etc.) can be built and applied to different parts of layout according to their circuit functions.

Different design rules can be established and applied to different areas of the layout, i.e., dummy cells and inside cells.

Approaches 1 and 2 can be combined to optimize both inside cells and failures caused by dummy cells.

Combined Approach

Figure 6:
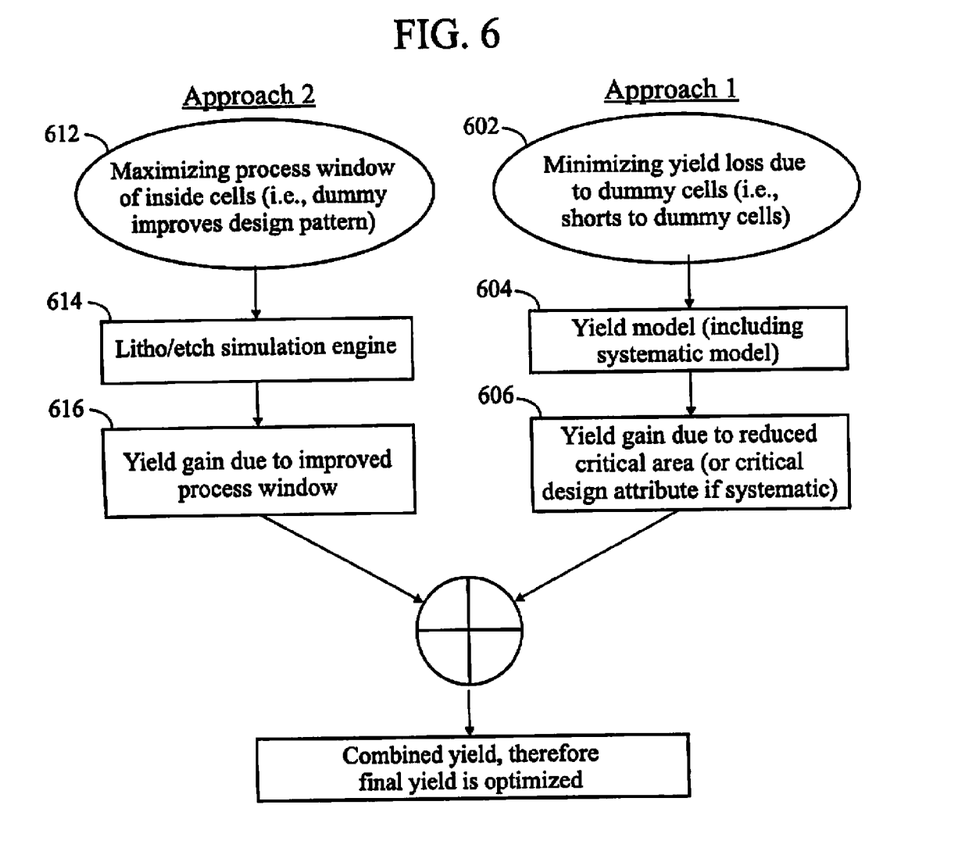
FIG. 6 is a diagram of a third embodiment, or approach, to optimizing dummy cells, according to the invention.

FIG. 6 illustrates combining the two embodiments (approaches) discussed hereinabove. Compare, for example, FIGS. 3 and 5.

Generally, using the first approach (Approach 1; compare FIG. 3),
- 602—Minimizing yield loss due to dummy cells (i.e., shorts to dummy cells)
- 604—Yield model (including systematic model)
- 606—Yield gain due to reduced critical area (or critical design attribute if systematic)

Figure 7:
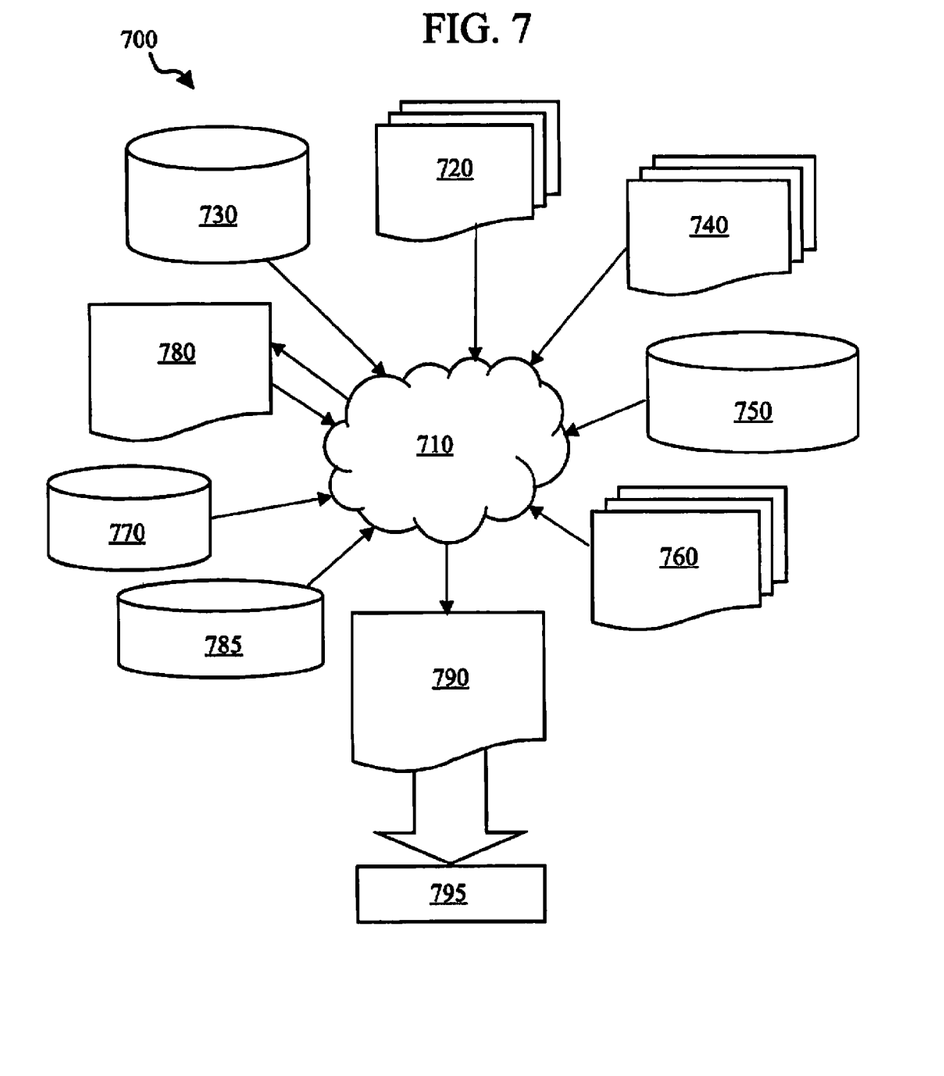
FIG. 7 is a diagram of an example design flow, according to the invention.

And, using the second approach (Approach 2; compare FIG. 5),
- 612—Maximizing process window of inside cells (i.e., dummy improves design pattern)
- 614—Litho/etch simulation engine
- 616—Yield gain due to improved process windows Combine the results of Approaches 1 and 2, therefore final yield is optimized Design Implementation FIG. 7 shows a block diagram of an example design flow 700. Design flow 700 may vary depending on the type of IC being designed. For example, a design flow 700 for building an application specific IC (ASIC) may differ from a design flow 700 for designing a standard component. Design structure 720 is preferably an input to a design process 710 and may come from an IP provider, a core developer, or other design company or may be generated by the operator of the design flow, or from other sources. Design structure 720 comprises a process dummy structure 266 or 466 in the form of schematics or HDL, a hardware-description language (e.g., Verilog, VHDL, C, etc.). Design structure 720 may be contained on one or more machine readable medium. For example, design structure 720 may be a text file or a graphical representation of the process dummy structure 266 or 466. Design process 710 preferably synthesizes (or translates) the process dummy structure 266 or 466 into a netlist 780, where netlist 780 is, for example, a list of wires, transistors, logic gates, control circuits, I/O, models, etc. that describes the connections to other elements and circuits in an integrated circuit design and recorded on at least one of machine readable medium. This may be an iterative process in which netlist 780 is re-synthesized one or more times depending on design specifications and parameters for the circuit.

Design process 710 may include using a variety of inputs; for example, inputs from library elements 730 which may house a set of commonly used elements, circuits, and devices, including models, layouts, and symbolic representations, for a given manufacturing technology (e.g., different technology nodes, 32 nm, 45 nm, 90 nm, etc.), design specifications 740, characterization data 750, verification data 760, design rules 770, and test data files 785 (which may include test patterns and other testing information). Design process 710 may further include, for example, standard circuit design processes such as timing analysis, verification, design rule checking, place and route operations, etc. One of ordinary skill in the art of integrated circuit design can appreciate the extent of possible electronic design automation tools and applications used in design process 710 without deviating from the scope and spirit of the invention. The design structure of the invention is not limited to any specific design flow.

Design process 710 preferably translates an embodiment of the invention as shown in FIGS. 3 and 5, along with any additional integrated circuit design or data (if applicable), into a second design structure 790. Design structure 790 resides on a storage medium in a data format used for the exchange of layout data of integrated circuits (e.g. information stored in a GDSII (GDS2), GL1, OASIS, or any other suitable format for storing such design structures). Design structure 790 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 3 and 5. Design structure 790 may then proceed to a stage 795 where, for example, design structure 790: proceeds to tape-out, is released to manufacturing, is released to a mask house, is sent to another design house, is sent back to the customer, etc.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for laying out process dummy cells in relationship to inside memory cells of a memory array comprising the steps of:
   (a) calculating an initial process performance parameter for the memory array;
   (b) using a computer-based design and layout system to change dummy cell layout configuration for a layer electrically connected to inside cells, such that selected ones of the process dummy cells are positioned at a first distance from a neighboring polysilicon line, and the inside cells are positioned at a second distance from a neighboring polysilicon line, wherein the first distance is larger than the second distance;

(c) applying lithographic simulation and yield model for both the inside memory cells and the changed layout configuration process dummy cells; and (d) repeating steps (b) and (c) until yield is maximized.

2. The method of claim 1, including:
selecting yield as the process performance parameter;
changing the dummy cell layout in small steps; and
checking whether yield is improved each time a small step is made.

3. The method of claim 1, including:
selecting the layout configuration from the group consisting of size, shape and position of at least selected ones of the process dummy cells.

4. The method of claim 1, further including:
checking that there is enough room to make the change between the steps (b) and (c).

5. The method of claim 1, further including:
checking that there is no significant adverse effect to neighboring circuits between the steps (b) and (c).

6. The method of claim 1, including:
selecting yield as the process performance parameter; and
further comprising:
calculating limited yield due to the dummy cells in the step (c).

7. The method of claim 1, further including:
comparing yield before and after the change in the step (d).

8. The method of claim 1, including:
selecting a process window as the process performance parameter for the inside memory cells; and
further comprising:
putting the process dummy cells on separate layers from the inside memory cells;
applying lithographic simulation to changed layout and check if process window for the inside cell is improved; and
repeating steps (b) and (c) until process window for the inside memory cells is maximized.

* * * * *